May 19, 1970 — R. N. AUGER — 3,512,452

PHOTO-VALVE

Filed Feb. 2, 1968

INVENTOR
RAYMOND N. AUGER
BY Smythe & Moore
ATTORNEYS

United States Patent Office 3,512,452
Patented May 19, 1970

3,512,452
PHOTO-VALVE
Raymond N. Auger, New York, N.Y., assignor to Cutler Controls Inc., Berwyn, Pa., a corporation of Pennsylvania
Filed Feb. 2, 1968, Ser. No. 702,573
Int. Cl. F15b 5/00; G05d 10/00; G01n 2/22
U.S. Cl. 91—3
3 Claims

ABSTRACT OF THE DISCLOSURE

A light sensitive fluidic control device wherein a flowing stream of fluid is varied by an electrical-mechanical transducer in response to a light sensitive cell.

---

The present invention relates to a fluidic control device, more particularly, to such a device where the output of a fluid stream is controlled in response to a photo-electric cell.

Various forms of fluidic devices have been used in controlled circuits for a wide variety of applications. In such fluidic devices, a stream of fluid is varied or controlled in some manner with the output of the control stream being used to actuate control systems. In most applications, the fluid stream is varied by the interaction of a second controlling fluid stream. However, in certain specific fields of application, it is desired that the stream of fluid be controlled in response to some other electrical or mechanical stimulus. As a result, various forms of pilot pressure have been investigated for operating fluidic devices.

It is an object of the present invention to provide a fluidic control device utilizing photon energy for pilot pressure.

It is another object of the present invention to provide a compact and simplified structure for a light operated fluidic device.

In one aspect of the present invention, the light sensitive fluidic control device disclosed herein may comprise a light sensitive cell mounted in a body member and generating an output signal in response to the light impinging on the cell. A conduit has one end conected to a source of fluid pressure and is mounted in the body member with its other end being on output for connection to a structure to be controlled. The conduit is formed with a gap therein. An electrical-mechanical transducer which may comprise a d'Arsonval galvanometer having a vane mounted on its movable pointer is positioned within the body member. The vane is positioned for movement within the conduit gap so that the flow of fluid in the conduit is responsive to the output signal of the light sensitive cell and, as a result, the conduit outlet is correspondingly controlled.

Other objects and advantages of the present invention will be apparent upon reference to the accompanying when taken in conjunction with the following drawings, which are merely exemplary.

In the drawings.

Proceeding next to the drawings wherein like reference symbols indicate the same parts throughout the various views a specific embodiment of the present invention will be described in detail.

Figure 1:
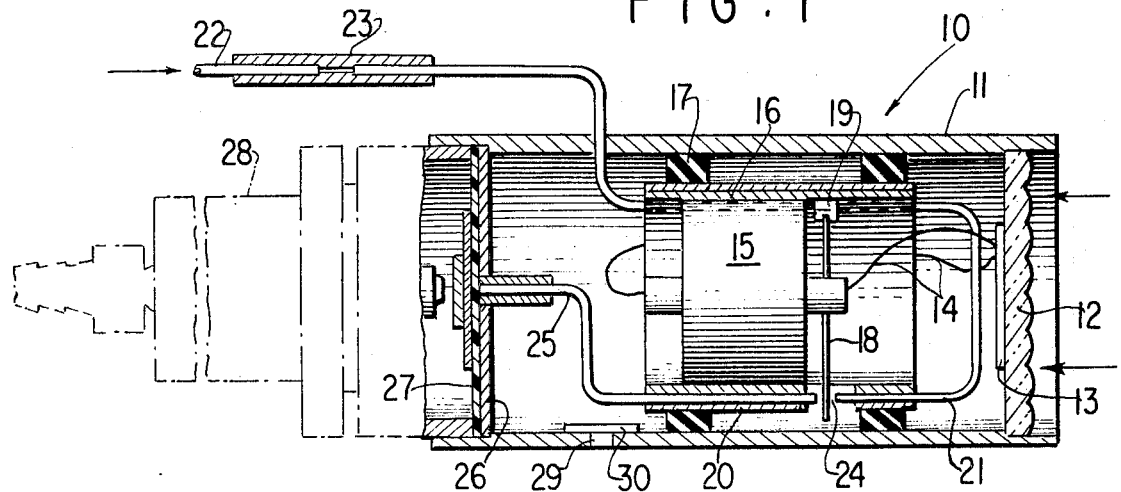
FIG. 1 is a longitudinal sectional view through a fluidic control device according to the present invention.

With particular reference to FIG. 1 the fluidic control device of the present invention is illustrated generally at 10 and comprises a substantially cylindrical body member 11 having a lens 12 at one end thereof with a light sensitive photoelectric cell 13 mounted behind the lens. Cell 13 is connected through electrical leads 14 to a d'Arsonval galvanometer 15 mounted in a housing 16 supported on rubber shock mounts 17. The galvanometer is provided with a movable vane-like pointer 18 engageable with a stop 19 to limit the movement of the pointer. A clamp ring 20 is positioned around the housing 16 for securing a conduit 21 in position against the housing.

The input end of conduit 21 is indicated at 22 and is connected to a suitable source of fluid under pressure. A restrictor 23 is mounted in the conduit near the input. The conduit is provided with a gap 24 positioned to enable the vane-like pointer 18 to move in the gap. The other or outlet end of the conduit is indicated at 25 and is mounted in a transverse wall 26 within the body member. A flexible diaphragm 27 is mounted opposite the conduit outlet end and is movable in response to the fluid pressure emitted from the conduit. A valve, which may be controlled by the above described fluidic device is indicated in phantom lines at 28.

The wall of body member 11 is provided with a vent 29 having a filter 30 positioned over the vent.

In operation, the device is positioned where the lens 12 will receive light energy, such as in a flame detection situation including furnace flame sensing for fuel valve control or for actuating pressurized fire extinguisher systems. The light impinging on the photoelectric cell will generate sufficient energy which in turn is transmitted to the galvanometer and the pointer of galvanometer is moved in response to the light impinging on the photoelectric cell. The pointer moves within the conduit gap and thus varies the stream of fluid flowing through the conduit whereby the output of the conduit will be controlled. In most applications, the fluid flow through the conduit will be laminar, but laminar flow is not necessary for the proper operation of the subject device.

Figure 2:
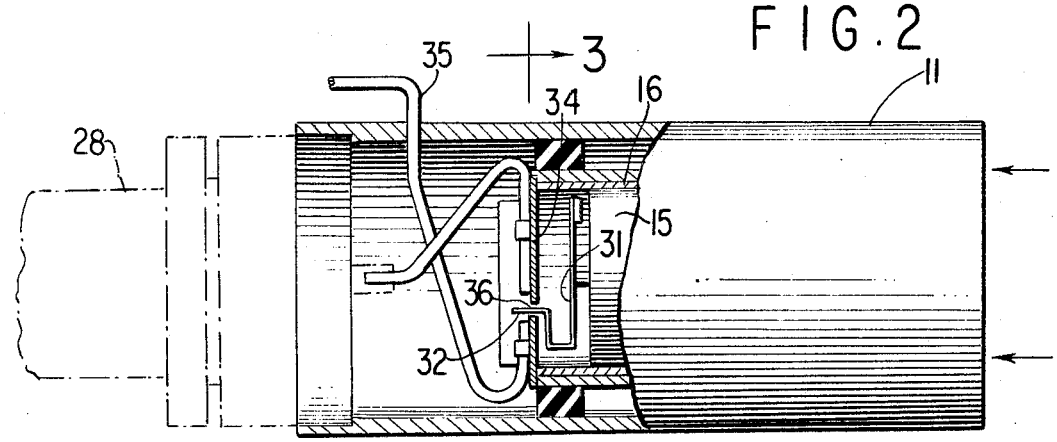
FIG. 2 is a partial longitudinal sectional view of a modification of the fluidic device illustrated in FIG 1.
Figure 3:
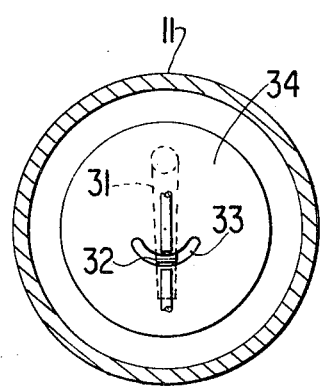
FIG. 3 is a sectional view taken along the line 3—3 of FIG. 2.

In the modification of FIG. 2, the galvanometer 15 is provided with a different shaped pointer 31 with one end of the pointer defining a vane 32 and movable in an arcuate slot 33 formed in a transverse wall 34 mounted one one end of the galvanometer housing 16. A conduit 35 having a gap 36 is mounted on the side of transverse wall 34 opposite from the galvanometer. The gap 36 is generally aligned with the arcuate slot 33 so that the vane 32 is movable to interrupt the flow of fluid to the conduit at the gap.

The operation of the modification of FIG. 2 is similar to that of the embodiment described in FIG. 1 in that the flow of fluid through the conduit will be varied in response to the light impinging on the photoelectric cell.

Thus it can be seen that the present invention discloses a light sensitive fluidic control device having a built-in photo cell wherein the photo cell requires no electrical energy—in the form of batteries or external voltage—for its operation. The light impinging on the end of the control device carrying the photoelectric cell supplies all the energy required to operate the pilot element. In addition, there is no necessity for an amplifier for the photo cll nor for a separate solenoid operated valve. The fluidic control device requires no electrical wires and is safe in operation, thereby presenting no fire or health hazard. The sensitivity of the photoelectric cell may be varied for different applications, depending upon the light source which is to operate the control device.

While the fluidic control device of the present invention is capable of a wide range of applications, some of these applications might include fire hazard locations, large systems for which wiring costs are high, and situations where the valves must be operated in inaccessible places or the valves are remotely operated such as on air operated overhead hoists, large doors or the like.

It is to be understood that various details of construction and arrangement of parts can be made without departing from the spirit of the invention except as defined in the appended claims.

What is claimed is:

1. In a light sensitive fluidic control device comprising a cylindrical body member, a lens having a light sensitive cell mounted therebehind at one end of said body generating an output signal in response to the light impinging on said cell, a galvanometer in said body connected to said cell and having a movable pointer thereon, conduit means connected to a source of fluid under pressure and extending longitudinally through said body and exteriorly of said galvanometer, said conduit having a gap therein adjacent one end of said galvanometer and said pointer being movable therein to interrupt variably the flow of fluid therethrough in response to said galvanometer, a transverse wall within said body at the opposing end thereof relative to said cell and being connected to the outlet end of said conduit means whereby pressure controllable means associated with said device is responsive to fluid pressure from said conduit.

2. In a light sensitive fluidic control device as claimed in claim 1 and further comprising a body member with said cell, conduit means and transducer means being mounted therein, a transverse wall within said body member with said galvanometer and said cell being on one side thereof, there being an arcuate slot in said wall for movement of said vane therein, said conduit means being mounted on the other side of said wall with said gap being positioned at said arcuate slot.

3. In a light sensitive fluidic control device as claimed in claim 1 wherein a flexible diaphragm is mounted on said transverse wall opposite to the outlet end of said conduit and is movable in response to the fluid pressure emitted from said conduit.

References Cited

UNITED STATES PATENTS

| | | | |
|---|---|---|---|
| 2,912,858 | 11/1959 | Fuller | 250—218 X |
| 2,921,595 | 1/1960 | Erbguth | 137—83 X |
| 3,223,102 | 12/1905 | Kies | 137—82 |
| 2,967,450 | 1/1961 | Shields | 250—218 X |

FOREIGN PATENTS 689,814   6/1930   France.

ALAN COHAN, Primary Examiner

U.S. Cl. X.R.
137—83; 250—218